US008263006B2

(12) United States Patent
Sutherland et al.

(10) Patent No.: US 8,263,006 B2
(45) Date of Patent: Sep. 11, 2012

(54) REACTOR WITH UPPER AND LOWER MANIFOLD STRUCTURES

(75) Inventors: James Scott Sutherland, Corning, NY (US); Andrew David Woodfin, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 99 days.

(21) Appl. No.: 12/533,359

(22) Filed: Jul. 31, 2009

(65) Prior Publication Data
US 2010/0303674 A1 Dec. 2, 2010

Related U.S. Application Data

(60) Provisional application No. 61/182,737, filed on May 31, 2009.

(51) Int. Cl.
| | |
|---|---|
| *B01J 19/00* | (2006.01) |
| *B01D 50/00* | (2006.01) |
| *B01D 53/34* | (2006.01) |
| *F01N 3/00* | (2006.01) |
| *B01J 8/00* | (2006.01) |
| *B01J 8/02* | (2006.01) |
| *B01J 35/02* | (2006.01) |
| *B01J 8/06* | (2006.01) |
| *F28D 21/00* | (2006.01) |

(52) U.S. Cl. ........ 422/129; 422/168; 422/177; 422/180; 422/198; 422/202; 422/211; 422/600; 422/650; 422/651; 422/654

(58) Field of Classification Search .................. 422/129, 422/198, 202, 654, 600, 650, 651, 211, 168, 422/177, 180; 429/437, 513
See application file for complete search history.

(56) References Cited

U.S. PATENT DOCUMENTS

| | | | | |
|---|---|---|---|---|
| 5,107,926 | A | 4/1992 | Calleson ....................... | 165/173 |
| 5,811,062 | A * | 9/1998 | Wegeng et al. ................ | 422/129 |
| 6,040,266 | A * | 3/2000 | Fay et al. ...................... | 502/439 |
| 6,103,409 | A * | 8/2000 | DiPierno Bosco et al. ... | 429/446 |
| 6,148,761 | A | 11/2000 | Majewski et al. ............. | 118/715 |
| 6,773,684 | B2 * | 8/2004 | Lesieur et al. ................ | 422/198 |
| 7,285,153 | B2 | 10/2007 | Bruun et al. ..................... | 95/43 |
| 2002/0031455 | A1 | 3/2002 | Hippel et al. ................. | 422/173 |
| 2002/0086200 | A1* | 7/2002 | Margiott ........................ | 429/38 |
| 2003/0086844 | A1 | 5/2003 | Adusei et al. ................. | 422/222 |
| 2004/0261379 | A1 | 12/2004 | Bruun et al. .................... | 55/418 |
| 2006/0219397 | A1 | 10/2006 | Bruun et al. .................. | 165/165 |
| 2008/0029406 | A1 | 2/2008 | Nelson et al. ................. | 205/633 |

FOREIGN PATENT DOCUMENTS

| | | |
|---|---|---|
| EP | 0599972 B1 | 11/1996 |
| EP | 1716908 A1 | 11/2006 |
| EP | 1583890 B1 | 3/2007 |

(Continued)

*Primary Examiner* — Walter D Griffin
*Assistant Examiner* — Natasha Young
(74) *Attorney, Agent, or Firm* — Gregory V. Bean

(57) ABSTRACT

A reactor is provided comprising a reactor substrate and upper and lower manifold structures. The upper manifold structure and the lower manifold structure each comprise at least one flow directing cavity that reverses a flow direction of a fluid flowing through the relatively short open-ended channels of the substrate between the upper and lower manifold structures. The flow directing cavities of the upper and lower manifold structures are configured to direct fluid from the inlet region of the upper manifold structure to the outlet region of the lower manifold structure in an additional serpentine path defined by the flow direction reversals introduced by the upper and lower manifold structures. Additional embodiments are disclosed and claimed.

19 Claims, 5 Drawing Sheets

FOREIGN PATENT DOCUMENTS

| WO | WO93/04334 | 3/1993 |
| WO | WO2004/050229 A2 | 6/2004 |
| WO | WO2008/121390 | 10/2008 |
| WO | WO2010/024935 | 3/2010 |

* cited by examiner

US 8,263,006 B2

REACTOR WITH UPPER AND LOWER MANIFOLD STRUCTURES

CLAIM OF PRIORITY

This application is claims priority to U.S. patent application Ser. No. 61/182,737 filed May 31, 2009, titled "Reactor With Upper and Lower Manifold Structures".

CROSS-REFERENCE TO RELATED APPLICATIONS

This application is related to U.S. patent application Ser. No. 12/346,090 (SP07-254), filed Dec. 30, 2008, but does not claim priority thereto.

BACKGROUND

The present disclosure relates in general to serpentine manifolding of short straight fluid paths in honeycomb extrusion substrates and, more particularly, to serpentine manifolding structures that enable reactor optimization through variable cross-sectional area flow paths.

Chemical reactors with high reactant channel surface-to-volume ratio and large internal volumes can be configured to provide relatively short open-ended channels and relatively long internal serpentine channels by integrating a series of fluidic channel U-bend turns at opposite end faces of the reactor. U-bend turns can be formed by machining a shallow trench through a series of cells using, for example, a router and then by sealing the top of the trench using an end plate or plug material. Fluid flowing in one or more parallel channels meets the plug in the U-bend region and is redirected to flow away from the plug in one or more channels. Channels not dedicated to the relatively long serpentine path generally remain non-plugged, resulting in a large number of relatively short open-ended channels that can conduct fluid through the reactor substrate in a direction parallel to the axis of extrusion. These relatively short open-ended channels are in close proximity to the internal relatively long serpentine channels, enabling efficient heat transfer between fluids flowing in the two types of channels.

BRIEF SUMMARY

According to the subject matter of the present disclosure, various approaches are introduced for routing fluid through a reactor substrate in relatively short open-ended channels where the fluid passes through the substrate multiple times. Fluid flow in the relatively short open-ended channels is guided at each substrate end face via flow manifold structures with various flow directing cavities that are aligned to the relatively short open-ended channels. Fluid flowing in the relatively short open-ended channels is in close proximity to separate relatively long serpentine channels that run through the reactor substrate. The close proximity of the two types of channel enables heat transfer for precise temperature control of chemical reactions in at least one of the channels. Various configurations are presented where heat transfer fluid or reactant fluid is directed through the serpentine manifold path. Using this approach, heat transfer can be maximized in selected regions of the reactor.

In accordance with one embodiment of the present disclosure, a reactor is provided comprising a reactor substrate, an upper manifold structure, and a lower manifold structure. The reactor substrate comprises a plurality of interior substrate channels that extend between the upper and lower manifold structures. The interior substrate channels of the reactor substrate are delineated into a plurality of relatively short open-ended channels and at least one relatively long serpentine channel. The relatively long serpentine channel comprises a relatively long serpentine flow path comprising flow path segments in adjacent ones of the interior substrate channels. The upper or lower manifold structure comprises an inlet region in fluid communication with at least one relatively short open-ended channel. The upper or lower manifold structure comprises an outlet region in fluid communication with at least one relatively short open-ended channel. The upper manifold structure and the lower manifold structure each comprise at least one flow directing cavity that reverses a flow direction of a fluid flowing through the relatively short open-ended channels between the upper and lower manifold structures. The flow directing cavities of the upper and lower manifold structures are configured to direct fluid from the inlet region to the outlet region in an additional serpentine path defined by the flow direction reversals introduced by the upper and lower manifold structures. Additional embodiments are disclosed and claimed.

According to the present disclosure, serpentine manifolding of heat exchange fluids can be configured to achieve relatively high heat transfer performance in selected regions of the reactor. Serpentine manifolding of reactant channel fluids can minimize the volume of an unheated or uncooled entry region, as is described in further detail below.

In practicing the concepts of the present disclosure, it is noted that no changes are required in the fabrication of reactor substrates and that manifold structures may be fabricated from low-cost materials and coated where corrosion resistance is required (e.g., in reactant channel serpentine manifolding). As for the design of the manifolds described herein, it is noted that arbitrary serpentine manifold flow patterns may be selected to optimize performance for a given application without needing to modify the reactor substrate layout. In addition, serpentine manifold flow paths may be arranged in series and/or parallel to achieve desired heat transfer and pressure drop requirements. Finally, it is contemplated that manifold structures may be removed in the field for cleaning or replacement without having to replace the entire reactor substrate.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
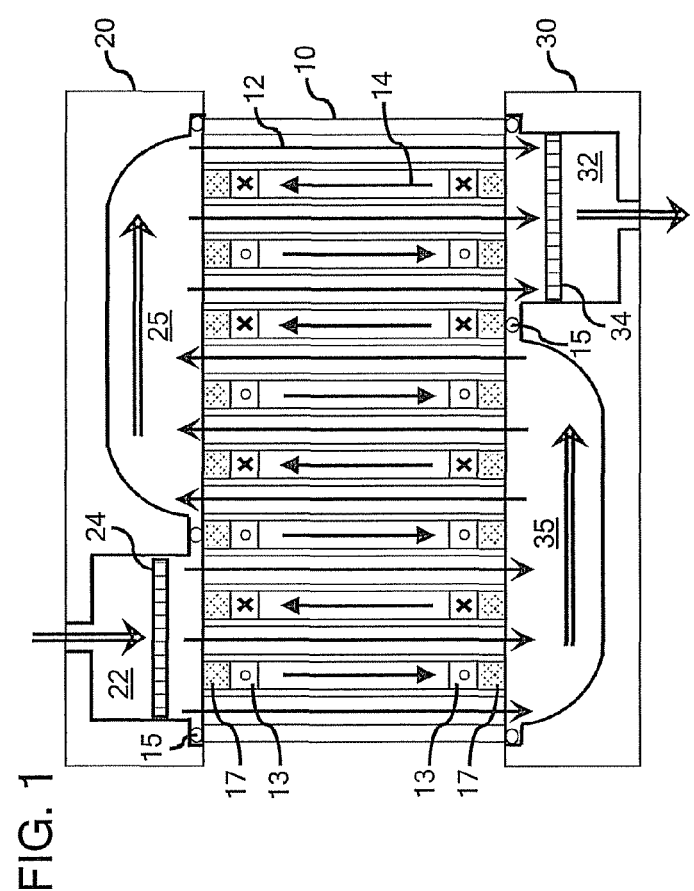
FIG. 1 illustrates a reactor comprising a reactor substrate and upper and lower manifold structures.
Figure 2:
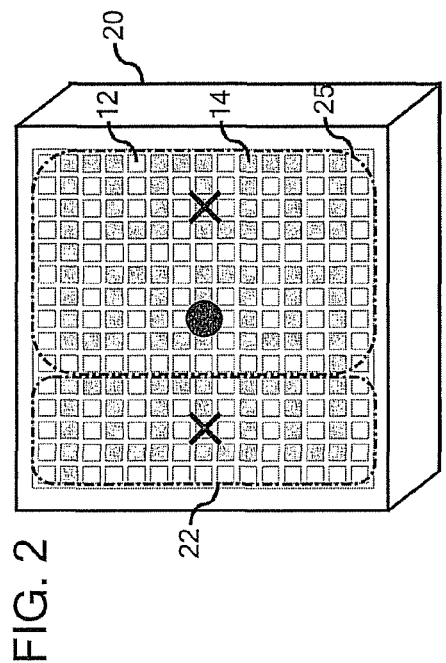
FIG. 2 illustrates the upper manifold substrate of FIG. 1.
Figure 3:
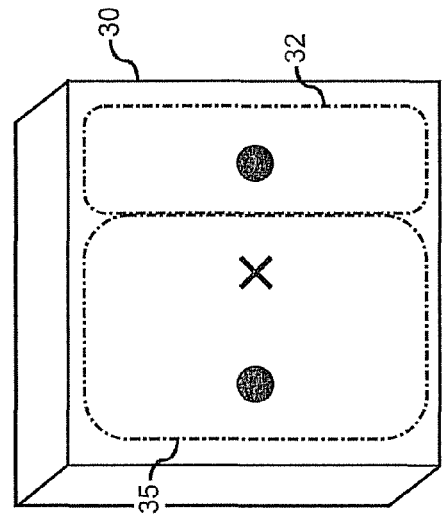
FIG. 3 illustrates the lower manifold substrate of FIG. 1.
Figure 5:
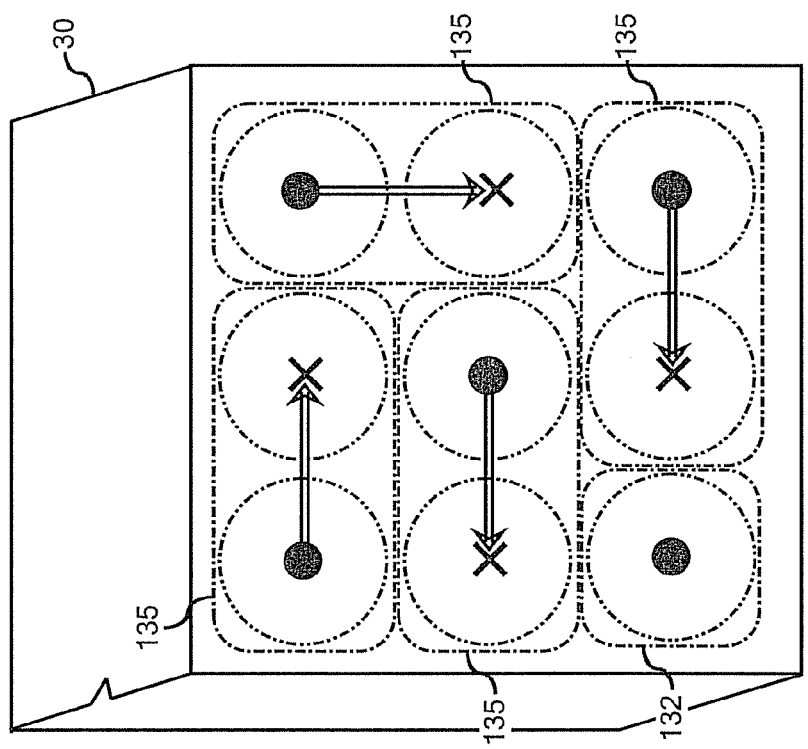
FIGS. 4 and 5 illustrates one alternative upper/lower manifold substrate configuration.

Referring initially to FIGS. 1-3, as is noted above, the present disclosure relates to a reactor 100 comprising a reactor substrate 10 and upper and lower manifold structures 20, 30 and introduces various approaches for routing fluid through the relatively short open-ended channels 12 of the reactor substrate 10 such that the fluid passes through the reactor substrate 10 multiple times. More specifically, the fluid flow through the relatively short open-ended channels 12 is guided at each substrate end face via the upper and lower manifold structures 20, 30, which comprise various flow directing cavities aligned with the relatively short open-ended channels 12. Fluid flowing in the relatively short open-ended channels 12 is in close proximity to one or more separate relatively long serpentine channels 14 that also run through the reactor substrate 10. The close proximity of the two types of channels enables heat transfer for precise temperature control of chemical reactions in the reactor substrate 10.

Referring further to FIG. 1, in one embodiment, heat exchange fluid can enter an inlet region 22 of the upper manifold structure 20 and pass through a flow distribution plate 24 to ensure uniform fluid velocity in each relatively short open-ended channel 12 below the inlet region 22. The fluid flows downward through the relatively short open-ended channels 12 and is then redirected upward by a U-bend cavity 35 in the lower manifold structure 30. O-rings 15 are positioned between the upper and lower manifold structures 20, 30 and the reactor substrate 10 to prevent leakage between adjacent flow directing cavities. After passing through the relatively short open-ended channels 12, the fluid flow is directed downward by another U-bend cavity 25 in the upper manifold structure 20. For the purposes of describing and defining the present invention, it is noted that a "U-bend" need not present a smooth U-shaped transition in the flow path. Rather, the U-bend merely reverses flow direction and can be presented in a variety of linear, angular, stepped, or curved configurations.

The heat exchange fluid exits the device at the outlet region 32 after passing through the last set of relatively short open-ended channels and a flow collection plate 34. FIGS. 2 and 3 help illustrate these respective directions x, • of fluid flow by referring to end-face views of the upper and lower manifold structures 20, 30. Throughout the present specification, x (a cross) should be taken as a designation of fluid flowing into the reference plane and • (a dot) should be taken as a reference to fluid flowing out of the reference plane. To optimize heat exchange, individual heat exchange channels 12 are positioned adjacent to corresponding serpentine reactant flow channels 14. It is contemplated that, the upper and lower manifold structures 20, 30 can be presented in a variety of configurations to optimize heat exchange. For example, it is contemplated that the outlet region 32 could be positioned in the upper manifold structure 20, as opposed to the lower manifold structure 30, if an additional flow directing cavity were to be provided in the lower manifold structure 30 to redirect fluid flow back in the direction of an outlet region in the upper manifold structure 20.

Figure 4:
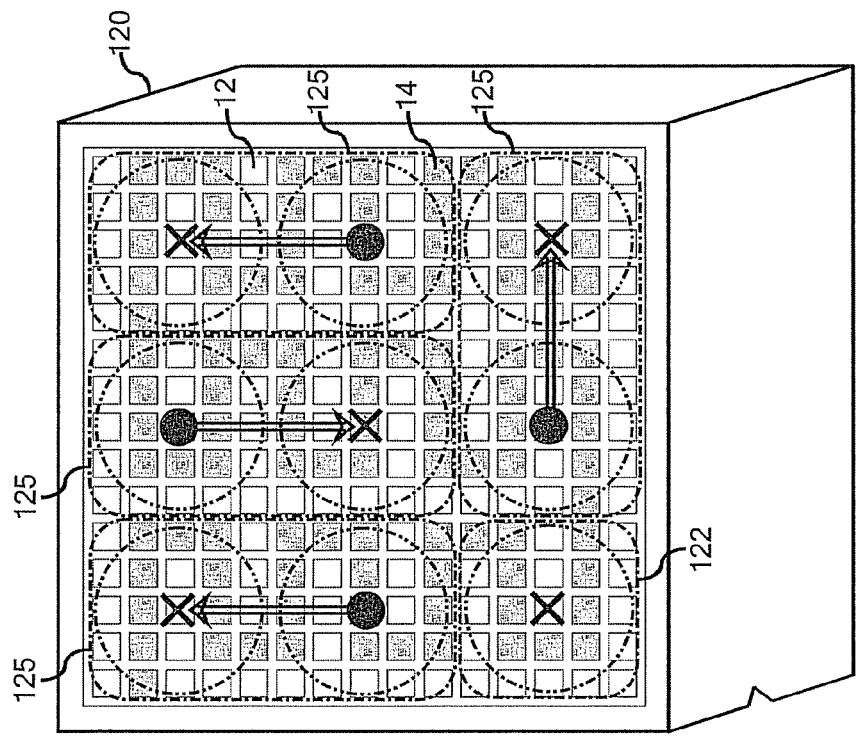
Figure 6:
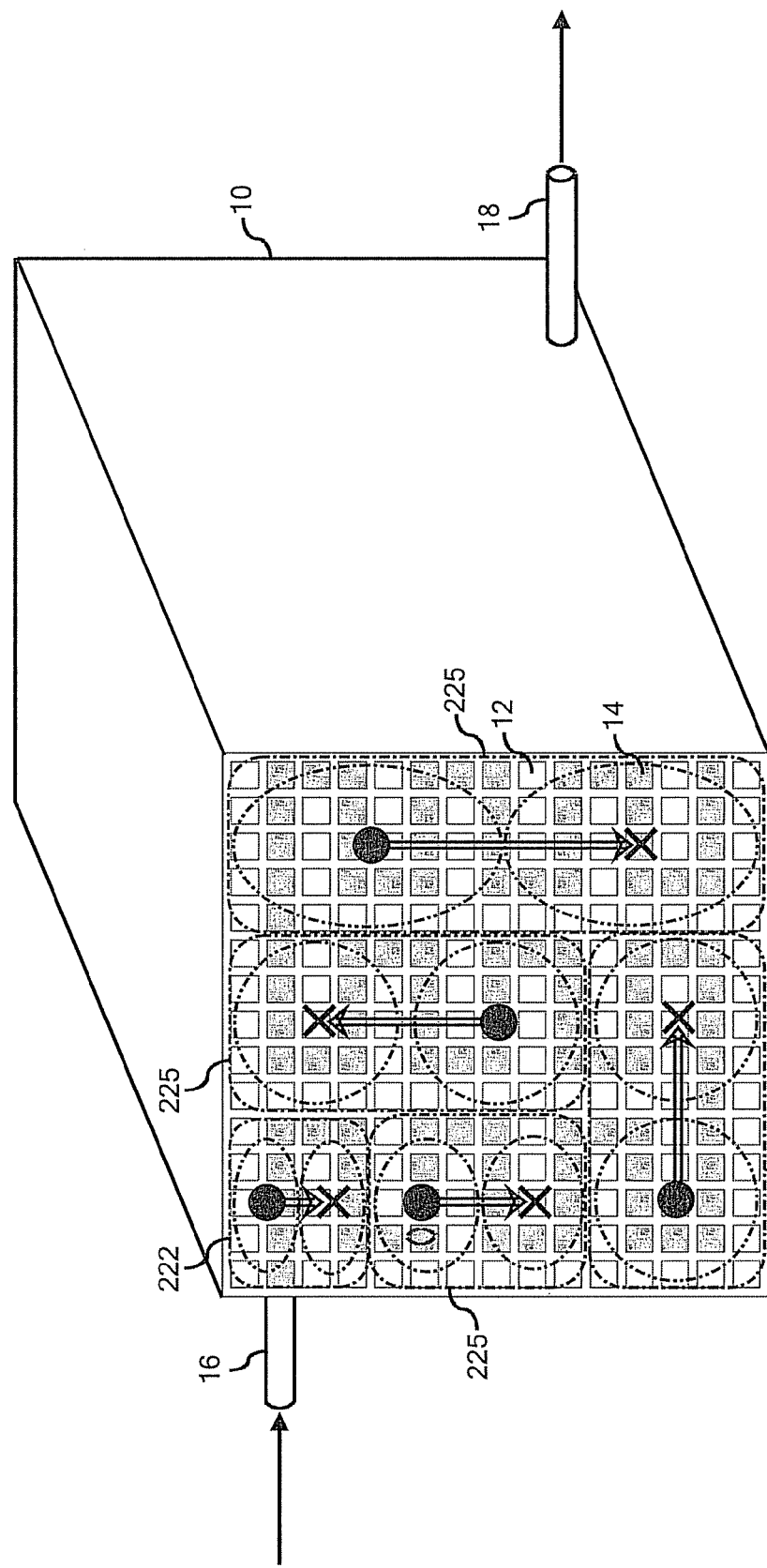
FIG. 6 illustrates an embodiment where the respective cross sectional areas of the flow directing cavities are varied.

Referring to FIG. 1, it is noted that the serpentine reactant flow channels 14 can be configured to extend from the reactant inlet 16 to the reactant outlet 18 by machining cut-outs 13 through respective end portions of adjacent flow channels in the reactor substrate 10 and sealing the channel ends using respective plugs 17 or one or more end plates. Fluid flowing in one or more parallel channels meets a plug 17 in the channel and is redirected through a cut-out 13 to flow away from the plug in an adjacent channel. The shaded channels of FIGS. 2, 4 and 6 illustrate a possible plug pattern.

Those practicing the concepts of the present disclosure should appreciate that the relatively short open-ended channels 12 are illustrated in a simple end-to-end configuration in FIG. 1 and could, for example, be configured as more complex flow structures incorporating multiple parallel flow segments, non-linear flow paths, or extended serpentine flow paths where end portions of selected ones of the otherwise relatively short open-ended channels are selectively modified to incorporate U-bends or other types of flow reversal structures. Similarly, the relatively long serpentine channel 14 may comprise a single serpentine channel or multiple serpentine channels 14 and can also be presented in a variety of configurations. The respective channels 12, 14 are merely referred to herein as "relatively short" and "relatively long" because the serpentine nature of the relatively long channel 14 will typically yield a longer flow path than the relatively short open-ended channels 12, even in the case of more complex flow paths in the relatively short open-ended channels 12. A variety of arrangements of heat exchange and reactant channels may be employed to optimize either reactant channel internal volume, local heat transfer performance, or both, depending on the particular objective of those practicing the concepts of the present disclosure.

Those practicing the concepts of the present disclosure should also appreciate that reactors 100 according to the present disclosure can be deployed in at least two common configurations. The first instance being where reactant fluid flows in the relatively long serpentine channels 14 of the reactor substrate 10 and the heat exchange fluid flows in the relatively short open-ended channels 12. The second instance being where heat exchange fluid flows in the relatively long serpentine channels 14 of the reactor substrate 10 and the reactant fluid flows in the relatively short open-ended channels 12. Accordingly, unless expressly stated, the scope of the present disclosure should not be limited by a determination of what type of fluid is flowing in which type of channel. All manifold and plate surfaces wetted by reactant fluid are typically corrosion resistant, via either material bulk properties or the properties of surface coatings.

The embodiment illustrated in FIGS. 1-3 may be extended by providing additional up and down heat exchange flow paths through the reactor substrate 10. For example, referring to the upper and lower manifolds 120, 130 of FIGS. 4 and 5, when heat exchange fluid flowing in the relatively short open-ended channels 12 meets the end face manifold structures 120, 130 it can be redirected laterally by flow directing cavities 125, 135 so fluid flow continues in the opposite direction in neighboring relatively short open-ended channels 12. The inlet and outlet regions 122, 132 are also illustrated schematically for clarity. As a result, heat exchange fluid flows through the reactor substrate 10 along a dual serpentine path, as is illustrated in the embodiments of FIGS. 1-3 and 4-5.

Additional heat exchange flow configurations are also contemplated, including patterns that vary the size and shape of the end face flow directing cavities to alter the total cross-sectional area of the flow path. This in turn modifies the local heat exchange fluid velocity in nearby relatively short open-ended channels. By adjusting the flow directing cavity areas heat exchange flow can be made higher in specific regions of the reactor where additional heat transfer is required. For example, in a typical chemical reaction that tales place in a relatively long serpentine path heat transfer requirements are highest near the inlet of the serpentine path. As the reaction continues as reactant fluid flows along the relatively long serpentine path heat transfer requirements are generally reduced.

FIG. 6 shows an example where the respective cross sectional areas of the flow directing cavities 225 are varied so that heat exchange fluid flow is highest in the region where reactant fluid first enters the reactor substrate 10, i.e., at the reactant inlet 16. Noting that the inlet region 222 and the flow directing cavities 225 of the upper manifold structure 220 are illustrated schematically in FIG. 6 for clarity, as the heat transfer requirement is reduced along the reaction path, the cross sectional area of successive flow directing cavities 225 along the heat exchange flow path are gradually increased. This approach helps ensure that the coolest heat exchange fluid is always in close proximity to the reactant channel region that requires the greatest heat transfer. For a constant local heat transfer coefficient h in this region, this approach ensures the greatest heat transfer since ΔT between the two types of channels is greatest. The high flow rate for heat transfer fluid in selective regions can also be used to increase the local heat transfer coefficient h by causing turbulent flow in certain relatively short open-ended channels.

Figure 7:
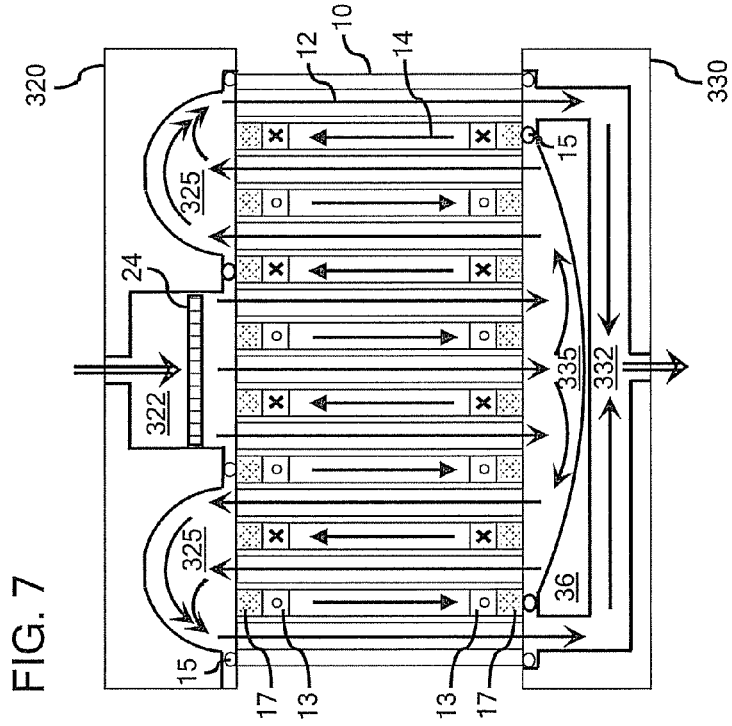
FIG. 7 shows a cross-sectional view of a reactor substrate with end face manifold structures that redirect heat exchange fluid in the radial direction.

Further, it is contemplated that the flow directing cavities of the respective upper and lower manifold structures may also be arranged in radial or azimuthal configurations to enhance heat transfer in specific regions. FIG. 7 shows a cross-sectional view of a reactor substrate 10 with end face manifold structures 320, 330 that redirect heat exchange fluid in the radial direction. Inlet and outlet regions 322, 332 are also illustrated. Heat exchange fluid enters at the center of the upper manifold structure 320 and passes through a flow distribution plate 24 before entering the series of relatively short open-ended channels 12. After passing through the relatively short open-ended channels 12, the heat exchange fluid strikes the inner surface of a flow redirecting plate 36 that redirects the fluid upward to a neighboring set of relatively short open-ended channels 12. Heat exchange fluid then strikes a radially-configured upper flow directing cavity 325 where it is directed downward through an outer ring of relatively short open-ended channels 12. The fluid is then collected in a disk-shaped channel structure formed by the outer surface of the flow redirecting plate 36 and an inner surface of the lower manifold structure 330. Heat exchange fluid exits the device through an outlet port in the center of the lower manifold structure 330. In operation, support members are provided to support the flow redirecting plate 36 within the lower manifold structure 330.

As with the embodiment illustrated in FIG. 6, the size and shape of the flow directing cavities 325, 335 in the radially-configured embodiment of FIG. 7 may be adjusted to provide enhanced heat exchange fluid flow in specific regions of the reactor substrate. Typically, regions spanned by the radially-configured flow directing cavities will not line up exactly with the relatively short open-ended channels 12. Therefore, the shape of the flow directing cavities in the upper and lower manifold plates 320, 330 may have to be configured to represent the curved areas of flow directing cavity manifolds via step-wise approximation. In this case O-rings may be replaced with preformed gasket seals that match the stepped perimeter of the flow directing cavity area.

Figure 10:
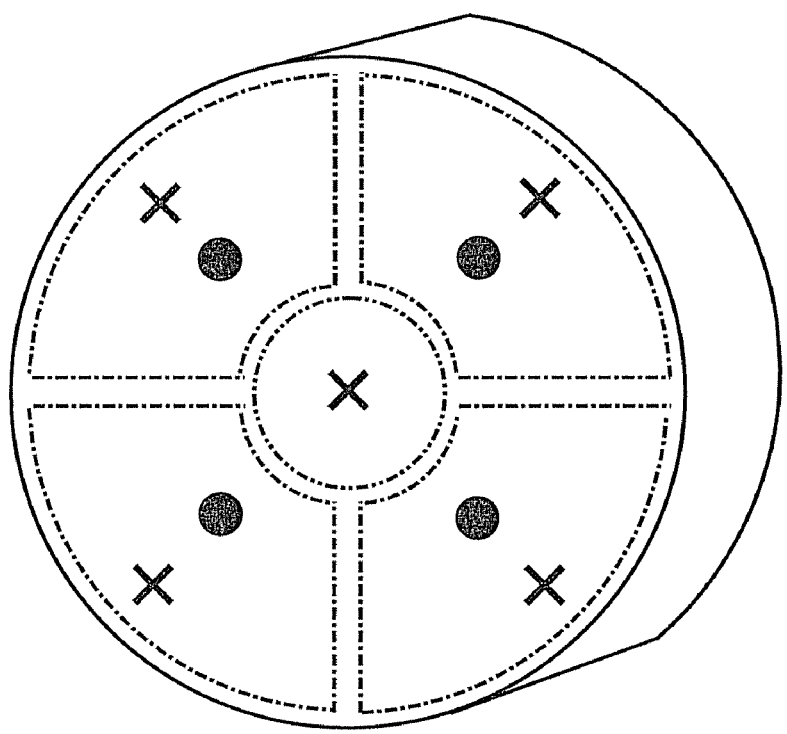
FIGS. 9 and 10 illustrate two examples of flow directing cavity configurations for realizing parallel flow in a manifold structure.
Figure 9:
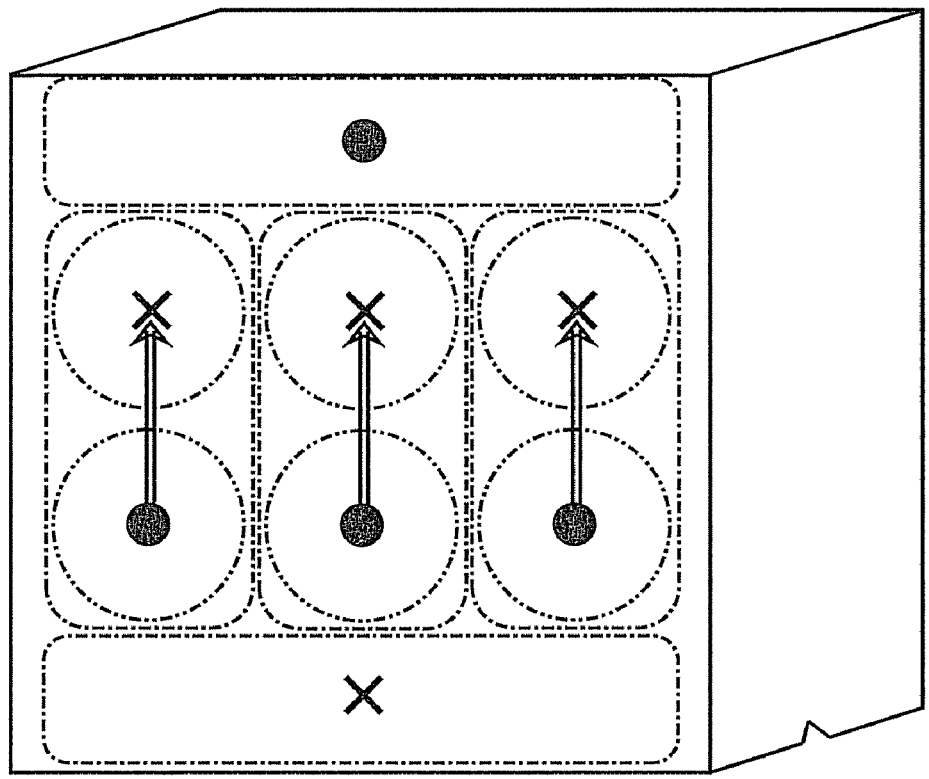

It is contemplated that additional heat exchange fluid flow path configurations are possible beyond simple dual serpentine paths. For example, various combinations of flow splitting and recombination configurations may be employed within the flow directing cavities and the flow channels to implement parallel and/or series flow conditions for heat exchange fluid in relatively short open-ended channels. Two examples of flow directing cavity configurations for realizing parallel flow in a manifold structure are illustrated schematically in FIGS. 9 and 10.

One challenge with reactor configurations where reactant flows in the short straight path is sufficient heating or cooling of reactant fluid upon first entering the device. This is important when fluid mixing is provided by a fluidic device, e.g., a microreactor, immediately upstream of the reactor. Normally, upon entering the device, reactant flows through a large fluid manifold to distribute the reactant fluid across the substrate end face. An advantage of the various embodiments disclosed herein is that the total volume of the reactant channel, prior to entry into the relatively short open-ended channels 12, can be very small. For example, the inlet region 322 in FIG. 7 is shown to comprise three relatively short open-ended channels 12 but, if necessary, this region could be made to merely comprise one channel 12 to minimize the unheated or uncooled entry region volume.

By adjusting the size and shape of flow directing cavities the flow rate of reactant fluid through relatively short open-ended channels may be varied. The residence time of each group of relatively short open-ended channels may also be tuned by adjusting flow directing cavity size. This approach allows the total heat transfer requirement of a given group of relatively short open-ended channels to be adjusted to match the heat transfer capability of adjacent relatively long serpentine heat exchange channels. This adjustment of the flow rate of reactant fluids through the relatively short open-ended channels may also be used to locally increase reactant fluid velocity to enhance heat transfer and fluid mixing via turbulence effects. In cases where heat exchange fluid flows through the relatively long serpentine heat exchange channels, these types of localized flow rate adjustments can be introduced to enhance heat transfer by increasing turbulence in localized high velocity flow portions.

In reaction applications where minimization of entry volume is not required, the reactor configuration illustrated in FIG. 7 can be inverted so that inlet fluid will flow immediately to peripheral relatively short open-ended channels 12.

Figure 8:
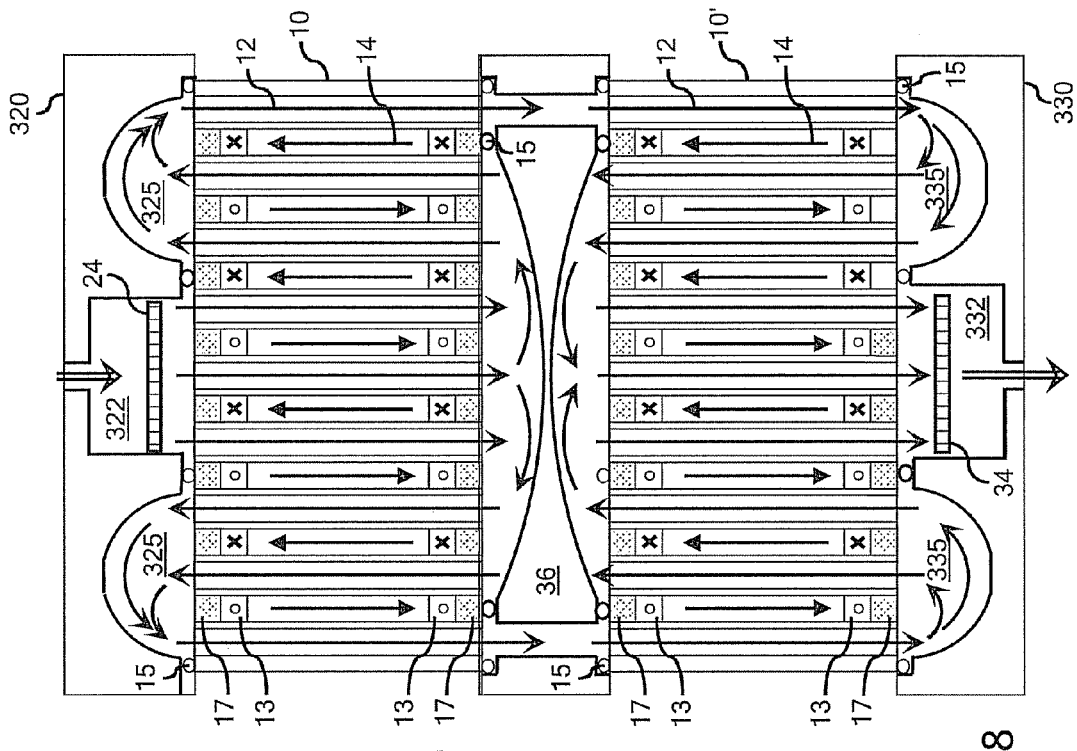
FIG. 8 illustrates a stacked reactor configuration.

Referring to FIG. 8, where like structure is indicated with like reference numerals, it is contemplated that multiple reactor substrates 10, 10' may be stacked to provide more complex internal flow structures. FIG. 8 shows a configuration where fluid flows radially outward via up and down flow in relatively short open-ended channels 12 in the upper reactor substrate 10, and radially inward via relatively short open-ended channels 12 in the lower reactor substrate 10'.

It is contemplated that one or more sensors may be integrated into the end face manifold structure flow directing cavities to monitor process conditions, e.g., temperature, pressure, flow, pH, etc., along the path of the fluid guided by flow directing cavities. Since the manifold structures are easily removed, the sensors may be cleaned or replaced during routine maintenance in field applications. The sensors may also be integrated into manifold structures used for process development, and then removed for fabrication of production reactors.

For the purposes of describing and defining the present invention, it is noted that a reactor may comprise any device that provides fluid flow channels for one or more fluids within its confines. Reactors cover a wide variety of channel sizes and should not be limited to specific interior volumes or fluid types. In addition, it is noted that the term reactor is not utilized herein to imply that a reaction necessarily occurs within its confines. Rather, it should be understood that a reactor may be used to enable a reaction, heat exchange, or both.

It is additionally noted that the references herein to "upper" and "lower" manifold structures are introduced to provide a clear distinction between the two manifold structures and should not be interpreted to require any specific orientation of the reactor. For example, although the upper manifold structure is illustrated herein at the top of the reactor, the reactor could just as well be inverted or rotated to any orientation, so the upper manifold structure would not be at the top of the reactor.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be talen as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids-within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

Having described the subject matter of the present disclosure in detail and by reference to specific embodiments thereof, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects. For example, reference has been made herein to a flow distribution plate 24 that ensures uniform fluid velocity but it is contemplated that there are a variety of techniques for ensuring that fluid flow is uniform as it enters a reactor. For example the upper manifold structure can provide internal channels that divide a single input channel into multiple channels with multiple outlets distributed at various locations over the reactor end face. It may also be desirable to have non-uniform fluid flow onto the mini-reactor end face, so that specific regions of the mini-reactor are more effectively heated or cooled by the inlet flow. Further, although O-rings 15 are utilized in the illustrated embodiments to prevent leakage, it is contemplated that sealing can also be accomplished by various gasket materials, elastomeric bond materials, e.g., filled silicones, or more rigid bond materials, e.g., filled epoxies.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A reactor comprising a reactor substrate, an upper manifold structure, and a lower manifold structure, wherein:
   the reactor substrate comprises a plurality of interior substrate channels that extend between the upper and lower manifold structures;
   the interior substrate channels of the reactor substrate are delineated into a plurality of relatively short open-ended channels and at least one relatively long serpentine channel;
   the relatively long serpentine channel comprises a relatively long serpentine flow path comprising flow path segments in adjacent ones of the interior substrate channels;
   the upper or lower manifold structure comprises an inlet region in fluid communication with at least one relatively short open-ended channel;
   the upper or lower manifold structure comprises an outlet region in fluid communication with at least one relatively short open-ended channel;
   the upper manifold structure and the lower manifold structure each comprise at least one flow directing cavity that reverses a flow direction of a fluid flowing through the relatively short open-ended channels between the upper and lower manifold structures; and
   the flow directing cavities of the upper and lower manifold structures are configured to direct fluid from the inlet region to the outlet region in an additional serpentine path defined by the flow direction reversals introduced by the upper and lower manifold structures.

2. A reactor as claimed in claim 1 wherein:
   the upper manifold structure comprises a U-bend flow directing cavity;
   the lower manifold structure comprises a U-bend flow directing cavity; and
   the upper and lower manifold structures are aligned relative to the relatively short open-ended channels to direct flow through the relatively short open-ended channels from the inlet region to the outlet region through the U-bend flow directing cavities of the upper and lower manifold structures.

3. A reactor as claimed in claim 1 wherein:
   the upper manifold structure comprises the inlet region and a U-bend flow directing cavity;
   the lower manifold structure comprises a U-bend flow directing cavity and an outlet region; and the upper and lower manifold structures are aligned relative to the relatively short open-ended channels to direct flow through the relatively short open-ended channels from the inlet region of the upper manifold structure, to the U-bend flow directing cavity of the lower manifold structure, to the U-bend flow directing cavity of the upper manifold structure, to the outlet region of the lower manifold structure, successively.

4. A reactor as claimed in claim 1 wherein:
the upper manifold structure comprises a plurality of U-bend flow directing cavities;
the lower manifold structure comprises a plurality of U-bend flow directing cavities; and
the upper and lower manifold structures are aligned relative to the relatively short open-ended channels to direct flow through the relatively short open-ended channels from the inlet region to the outlet region along a flow path that progresses successively through individual ones of the U-bend flow directing cavities in the upper and lower manifold structures.

5. A reactor as claimed in claim 4 wherein the cross-sectional flow area of a U-bend flow directing cavity positioned along a selected portion of the flow path is smaller or larger than the cross-sectional flow area of one or more U-bend flow directing cavities that are positioned along a different portion of the flow path.

6. A reactor as claimed in claim 4 wherein the cross-sectional flow area of a U-bend flow directing cavity positioned along a portion of the flow path that is relatively close to the inlet region is smaller than the cross-sectional flow area of one or more U-bend flow directing cavities that are closer to the outlet region.

7. A reactor as claimed in claim 4 wherein:
the relatively long serpentine channel extends from a reactant inlet portion to a reactant outlet portion; and
the portion of the flow path that is relatively close to the inlet region, and which comprises the smaller cross sectional flow area, is more directly thermally coupled to the reactant inlet portion of the relatively long serpentine channel than the reactant outlet portion of the relatively long serpentine channel.

8. A reactor as claimed in claim 4 wherein the cross-sectional flow area of successive U-bend flow directing cavities increases as the flow path that progresses from the inlet region to the outlet region.

9. A reactor as claimed in claim 8 wherein the increase in cross-sectional flow area is a single increase downstream of an initial minimally-sized U-bend flow directing cavity, a discontinuous increase downstream of an initial minimally-sized U-bend flow directing cavity, or a progressive increase at successive U-bend flow directing cavities.

10. A reactor as claimed in claim 4 wherein:
the cross-sectional flow area of a U-bend flow directing cavity positioned along a selected portion of the flow path is smaller or larger than the cross-sectional flow area of one or more U-bend flow directing cavities that are positioned along a different portion of the flow path; and
the increase or decrease in cross-sectional flow area is localized to enhance turbulence or heat exchange in a localized region of the flow path.

11. A reactor as claimed in claim 1 wherein:
the upper manifold structure comprises the inlet region and a plurality of U-bend flow directing cavities;
the lower manifold structure comprises a plurality of U-bend flow directing cavities and an outlet region; and the upper and lower manifold structures are aligned relative to the relatively short open-ended channels to direct flow through the relatively short open-ended channels from the inlet region of the upper manifold structure to the outlet region of the lower manifold structure along a flow path that progresses successively through individual ones of the U-bend flow directing cavities in the upper and lower manifold structures.

12. A reactor as claimed in claim 1 wherein:
the upper manifold structure comprises the inlet region and a radially-configured flow directing cavity;
the upper and lower manifold structures are aligned relative to the relatively short open-ended channels to direct flow through the relatively short open-ended channels from the inlet region of the upper manifold structure, to the flow directing cavity of the lower manifold structure, to the radially-configured flow directing cavity of the upper manifold structure, to the outlet region of the lower manifold structure, successively.

13. A reactor as claimed in claim 12 wherein:
the flow directing cavity of the lower manifold structure comprises a flow redirecting plate;
the flow directing plate of the lower manifold structure comprises a central portion aligned with the inlet region of the upper manifold structure and a peripheral portion aligned with the radially-configured flow directing cavity of the upper manifold structure.

14. A reactor as claimed in claim 1 wherein:
the upper manifold structure comprises a plurality of parallel U-bend flow directing cavities;
the lower manifold structure comprises a plurality of parallel U-bend flow directing cavities; and
the upper and lower manifold structures are aligned relative to the relatively short open-ended channels to direct flow through the relatively short open-ended channels from the inlet region to the outlet region through the U-bend flow directing cavities of the upper and lower manifold structures along a plurality of parallel flow paths.

15. A reactor as claimed in claim 1 wherein:
the upper manifold structure comprises the inlet region and a plurality of radially-configured flow directing cavities;
the upper and lower manifold structures are aligned relative to the relatively short open-ended channels to direct flow from the inlet region to the outlet region through the radially-configured flow directing cavities of the upper manifold structure in parallel.

16. A reactor as claimed in claim 1 wherein the reactor comprises upper and lower reactor substrates that are stacked such that fluid flows radially outward via relatively short open-ended channels in an upper reactor substrate and radially inward via relatively short open-ended channels in a lower reactor substrate.

17. A reactor as claimed in claim 1 wherein the reactor comprises one or more sensors integrated into the end face manifold structure flow directing cavities to monitor process conditions.

18. A reactor as claimed in claim 1 wherein a plurality of the relatively short open-ended channels are directly adjacent to selected ones of the relatively long serpentine channels.

19. A reactor comprising a reactor substrate, an upper manifold structure, and a lower manifold structure, wherein:
the reactor substrate comprises a plurality of interior substrate channels that extend between the upper and lower manifold structures;

the interior substrate channels of the reactor substrate are delineated into a plurality of relatively short open-ended channels and at least one relatively long serpentine channel;

the relatively long serpentine channel extends from a reactant inlet portion to a reactant outlet portion and comprises a relatively long serpentine flow path comprising flow path segments in adjacent ones of the interior substrate channels;

the upper and lower manifold structures comprise an inlet region and an outlet region;

the upper manifold structure comprises a plurality of U-bend flow directing cavities in fluid communication with at least one relatively short open-ended channel;

the lower manifold structure comprises a plurality of U-bend flow directing cavities in fluid communication with at least one relatively short open-ended channel;

the upper manifold structure and the lower manifold structure each comprise at least one flow directing cavity that reverses a flow direction of a fluid flowing through the relatively short open-ended channels between the upper and lower manifold structures;

the flow directing cavities of the upper and lower manifold structures are configured to direct fluid from the inlet region to the outlet region in an additional serpentine path defined by the flow direction reversals introduced by the upper and lower manifold structures;

the upper and lower manifold structures are aligned relative to the relatively short open-ended channels to direct flow through the relatively short open-ended channels from the inlet region to the outlet region along a flow path that progresses successively through individual ones of the U-bend flow directing cavities in the upper and lower manifold structures;

the cross-sectional flow area of a U-bend flow directing cavity positioned along a selected portion of the flow path is smaller or larger than the cross-sectional flow area of one or more U-bend flow directing cavities that are positioned along a different portion of the flow path; and the portion of the flow path that comprises the smaller cross sectional flow area is most directly thermally coupled to the reactant inlet portion of the relatively long serpentine channel.

\* \* \* \* \*